United States Patent
Sartor et al.

(10) Patent No.: US 9,928,059 B1
(45) Date of Patent: Mar. 27, 2018

(54) AUTOMATED DEPLOYMENT OF A MULTI-VERSION APPLICATION IN A NETWORK-BASED COMPUTING ENVIRONMENT

(71) Applicant: Amazon Technologies, Inc., Seattle, WA (US)

(72) Inventors: Markus Petrus Giuseppe Sartor, The Hague (NL); Isaac Alon Salpeter, The Hague (NL)

(73) Assignee: Amazon Technologies, Inc., Seattle, WA (US)

( * ) Notice: Subject to any disclaimer, the term of this patent is extended or adjusted under 35 U.S.C. 154(b) by 741 days.

(21) Appl. No.: 14/578,070

(22) Filed: Dec. 19, 2014

(51) Int. Cl.
G06F 9/445 (2006.01)
G06F 9/44 (2018.01)
G06F 11/36 (2006.01)

(52) U.S. Cl.
CPC .......... *G06F 8/71* (2013.01); *G06F 8/60* (2013.01); *G06F 11/3688* (2013.01)

(58) Field of Classification Search
None
See application file for complete search history.

(56) References Cited

U.S. PATENT DOCUMENTS

| | | | |
|---|---|---|---|
| 5,651,111 A | 7/1997 | McKeeman et al. | |
| 7,080,351 B1 | 7/2006 | Kirkpatrick et al. | |
| 7,437,712 B1 | 10/2008 | Brown et al. | |
| 7,568,183 B1 | 7/2009 | Hardy et al. | |
| 8,060,585 B2 | 11/2011 | Waud et al. | |
| 8,161,121 B2 | 4/2012 | Lu | |
| 8,176,483 B2 | 5/2012 | Hoefler et al. | |
| 8,225,281 B1 | 7/2012 | Hardinger et al. | |
| 8,490,084 B1 | 7/2013 | Alford et al. | |
| 8,677,315 B1 * | 3/2014 | Anderson | G06F 8/60 717/101 |
| 8,839,222 B1 * | 9/2014 | Brandwine | G06F 11/3668 717/168 |
| 8,869,135 B1 * | 10/2014 | Fitzgerald | G06F 9/45533 717/168 |

(Continued)

OTHER PUBLICATIONS

Allen, L., et al., Clearcase Multisite: Supporting Geographically-Distributed Software Development, 1995, pp. 194-214.

(Continued)

*Primary Examiner* — Isaac T Tecklu
(74) *Attorney, Agent, or Firm* — Knobbe, Martens, Olson & Bear, LLP (57) ABSTRACT

Systems and methods disclosed herein automate the process of deploying an application, whether for production or test purposes, to reduce or eliminate deployment errors. Systems herein can determine whether an application satisfies a set of tests and, in response to the application satisfying the set of tests, the systems can determine the files and related resources that are part of the tested application. The systems can then create an application definition for the application that includes the identity of the files and the related resources, including data and libraries used during execution of the application. This application definition can be linked with an instance container that is unique to a version of the application tested.

20 Claims, 5 Drawing Sheets

(56) References Cited

U.S. PATENT DOCUMENTS

| | | | |
|---|---|---|---|
| 2003/0158919 A1* | 8/2003 | Fomenko | G06F 8/60 709/220 |
| 2003/0182652 A1 | 9/2003 | Custodio | |
| 2004/0261053 A1 | 12/2004 | Dougherty et al. | |
| 2004/0261070 A1 | 12/2004 | Miller et al. | |
| 2005/0015762 A1 | 1/2005 | Steckler et al. | |
| 2005/0044162 A1 | 2/2005 | Liang | |
| 2005/0044531 A1* | 2/2005 | Chawla | G06F 8/71 717/122 |
| 2005/0108685 A1 | 5/2005 | Ta | |
| 2005/0114829 A1 | 5/2005 | Robin et al. | |
| 2005/0257217 A1* | 11/2005 | Woollen | G06F 8/61 717/177 |
| 2006/0184926 A1* | 8/2006 | Or | G06F 8/61 717/168 |
| 2006/0212857 A1 | 9/2006 | Neumann et al. | |
| 2006/0248522 A1 | 11/2006 | Lakshminarayanan et al. | |
| 2007/0006122 A1 | 1/2007 | Bailey et al. | |
| 2007/0061782 A1 | 3/2007 | Schreiner et al. | |
| 2007/0083859 A1 | 4/2007 | Fussell et al. | |
| 2007/0168919 A1* | 7/2007 | Henseler | G06F 8/61 717/101 |
| 2007/0234116 A1 | 10/2007 | Bayerlein | |
| 2007/0250574 A1* | 10/2007 | Tseitlin | G06F 8/61 709/205 |
| 2008/0016110 A1* | 1/2008 | Grossman | G06F 8/70 |
| 2008/0098385 A1 | 4/2008 | Alger | |
| 2008/0235075 A1 | 9/2008 | Couture | |
| 2009/0019420 A1 | 1/2009 | Johnson | |
| 2009/0037287 A1* | 2/2009 | Baitalmal | G06F 21/128 705/27.1 |
| 2009/0070734 A1 | 3/2009 | Dixon et al. | |
| 2009/0282401 A1* | 11/2009 | Todorova | G06F 8/61 717/175 |
| 2010/0058294 A1 | 3/2010 | Best et al. | |
| 2010/0088498 A1 | 4/2010 | Kreek et al. | |
| 2010/0153917 A1* | 6/2010 | Kramer | G06F 8/71 717/121 |
| 2010/0162226 A1 | 6/2010 | Borissov | |
| 2010/0235807 A1 | 9/2010 | Doddappa et al. | |
| 2010/0287547 A1 | 11/2010 | Korkishko | |
| 2010/0325624 A1* | 12/2010 | Bartolo | G06F 8/61 717/176 |
| 2011/0029963 A1 | 2/2011 | Smith et al. | |
| 2011/0078675 A1* | 3/2011 | Van Camp | G06F 8/65 717/170 |
| 2011/0173591 A1 | 7/2011 | Prasad | |
| 2011/0225217 A1 | 9/2011 | Plax et al. | |
| 2011/0283253 A1 | 11/2011 | Dutta | |
| 2011/0302472 A1 | 12/2011 | Van Eikema Hommes | |
| 2012/0150935 A1* | 6/2012 | Frick | G06Q 10/10 709/201 |
| 2012/0226804 A1 | 9/2012 | Raja | |
| 2012/0233322 A1 | 9/2012 | Baumback | |
| 2013/0007723 A1* | 1/2013 | Choudhary | G06F 8/65 717/170 |
| 2013/0036328 A1* | 2/2013 | Mutisya | G06F 11/3688 714/15 |
| 2014/0068588 A1* | 3/2014 | Tan | G06F 8/65 717/169 |
| 2014/0189641 A1 | 7/2014 | Anderson et al. | |
| 2014/0379901 A1* | 12/2014 | Tseitlin | H04L 43/08 709/224 |
| 2015/0159423 A1 | 6/2015 | Fu | |
| 2015/0199197 A1* | 7/2015 | Maes | G06F 8/71 717/122 |

OTHER PUBLICATIONS

Costa, H.R., et al., Evaluating Software Project Portfolio Risks, The Journal of Systems and Software, vol. 80, 2006, pp. 16-30.

Durrett, B., Scaling With Continuous Deployment, PowerPoint slides from Developer Summit dated Jun. 29, 2010.

Fagan, M., Design and Code Inspection to Reduce Errors in Program Development, 1976, IBM Systems Journal 15(3):301-334, 1976.

Farley, D., The Deployment Pipeline, CruiseControl Enterprise, ThoughWorks, Inc.—ThoughtWorks Studios, copyright 2007, pp. 1-11.

Fowler, M., Continuous Integration, http://martinfowler.com/articles/continuousintegration.html, dated May 1, 2006, retrieved Oct. 6, 2011.

Levy, M., et al., Agile Knowledge Management, IGI Global, copyright 2009, pp. 112-117.

Ries, E., Continuous Deployment in 5 Easy Steps, O'Reilly Radar, htt;://radar.oreilly.com/2009/03/continuous-deployment-5-eas.html, dated Mar. 30, 2009, retrieved Oct. 5, 2011.

* cited by examiner

AUTOMATED DEPLOYMENT OF A MULTI-VERSION APPLICATION IN A NETWORK-BASED COMPUTING ENVIRONMENT

BACKGROUND

Often, applications and services are hosted by one or more computer networks, which provides users with access to the applications and services on the users' local or personal computing devices. To provide large numbers of users with access to the applications and services, multiple host systems are usually employed. Further, it is often the case that multiple instances of an application or service will be deployed on multiple host systems.

To facilitate the installation or deployment of the application or service, an install script may be created. This install script may be configured to identify files to install and the locations in which to store the installed files. Further, the install script may include information relating to configuring the host machine to execute the installed files.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure. Further, elements are not drawn to scale and two elements that appear to be of the same size may be of different size, and vice versa.

DESCRIPTION

Introduction

Install scripts typically make deploying an application easier compared to the manual deployment of files and configuration of host computing systems. However, it is often necessary to modify install scripts for different host systems. Further, each time a new version of the application is created, whether for testing or for deployment to customers, a new install script is often necessary. For instance, if a new file is added to the application, an existing file is renamed or moved to a new location, or a new version of a library is utilized for the application, it is often necessary to modify the install script.

The manual creation of the install script can be time consuming. Further, a number of errors can arise during the creation of the install script. This can particularly be the case during development of the application when a number of versions of the application may be tested as features are added and errors, or bugs, are removed from the application. A number of the iterations of the application under test, and in some cases every iteration, may require a modification to the install script. Each time the install script is modified, there is a risk of error. Further, if the error is not identified, it may be included in the install script that is used with a production version of the application.

Various embodiments of systems and methods disclosed herein automate the process of deploying an application, whether for production or test purposes, to reduce and eliminate deployment errors. Systems herein can determine whether an application satisfies a set of tests. In response to the application satisfying the set of tests, the systems can determine, without user input, the files and related resources that are part of the tested application. The systems can then create an application definition for the application that includes the identity of the files and the related resources, including data and libraries used during execution of the application. This application definition can be linked with an instance container that is unique to a version of the application tested.

Each instance of an application generated based on the application definition linked to the instance container may be administratively bound to the instance container. Thus, the systems disclosed herein may generate an instance of an application using the versions of packages, files, and resources identified in the application definition. The systems may then bind the generated application instance to the instance container thereby identifying the instance as being generated based on the particular application definition associated with the instance container. Binding an instance to the instance container may include listing or otherwise including the instance in a list or other data structure of the instance container. Further, binding the instance to the instance container may include storing an identifier or reference to the instance in a data structure of the instance container. In many implementations, an instance is bound to only one instance container. If an instance (by accident or for some other reason) is a member of more than one instance container, the systems herein may take actions to resolve the conflict. For example, an exception can be thrown, and the systems herein may prevent the specific instance from entering an active or online state. An instance container can include zero or more instances (e.g., 0, 1, 2, 3, 4, or more instances).

Although the term container is used herein, it should be understood that the instance container does not necessarily provide a physical boundary for the application or instances thereof. Instead, the instance container may be a logical grouping of instances rather than a physical grouping. Further, the instance container may identify to which application definition or version-set an application instance belongs. In certain implementations, the instance container includes data that is used to define a version of an application that may be deployed. Multiple instances of the application may be deployed and while in some cases the application definition linked to the instance container may provide some limitations on the deployment of an instance of the application, generally the instance container does not limit where an instance of an application may be deployed. For example, some instances of the application bound to the instance container may be deployed on computer systems in North America while other instances of the application may be deployed on computer systems in Europe. Moreover, as application instances are based on the application definition linked to the instance container, typically an instance of an application is a member of a single instance container.

As new versions of the application are tested, or generated, the systems described herein can create new instance containers that are separate from each other. Advantageously, in certain embodiments, by creating separate instance containers that correspond to different application definitions, errors relating to artifacts from previously deployed application instances are eliminated because, for example, each version of an application may be located in a separate namespace or memory space corresponding to the application's instance container. Further, in certain embodiments, by automatically determining an application definition from a successfully tested version of the application, errors relating to the user of incorrect file versions or configurations that can occur with manually generated installs scripts are eliminated.

In some implementations, systems herein can update or rollback versions of applications by identifying the current or active instance container corresponding to the version of the application selected for deployment. Further, multiple instance containers can be selected for deployment. For example, iterations of an application can slowly be rolled out to users by permitting multiple (e.g., two or three or more) versions of an application to be hosted by a networked computing environment. To enable the multiple versions of the application, the corresponding instance containers for each version may be designated for selection when a new application instance is desired.

Systems herein can update or rollback versions of the applications by identifying application instances that correspond to deprecated or old instance containers and removing the identified application instances. The systems herein can replace the removed application instances by deploying new application instances based on application definitions corresponding to the active or designated instance containers.

Example Program Execution Service Environment

Figure 1:
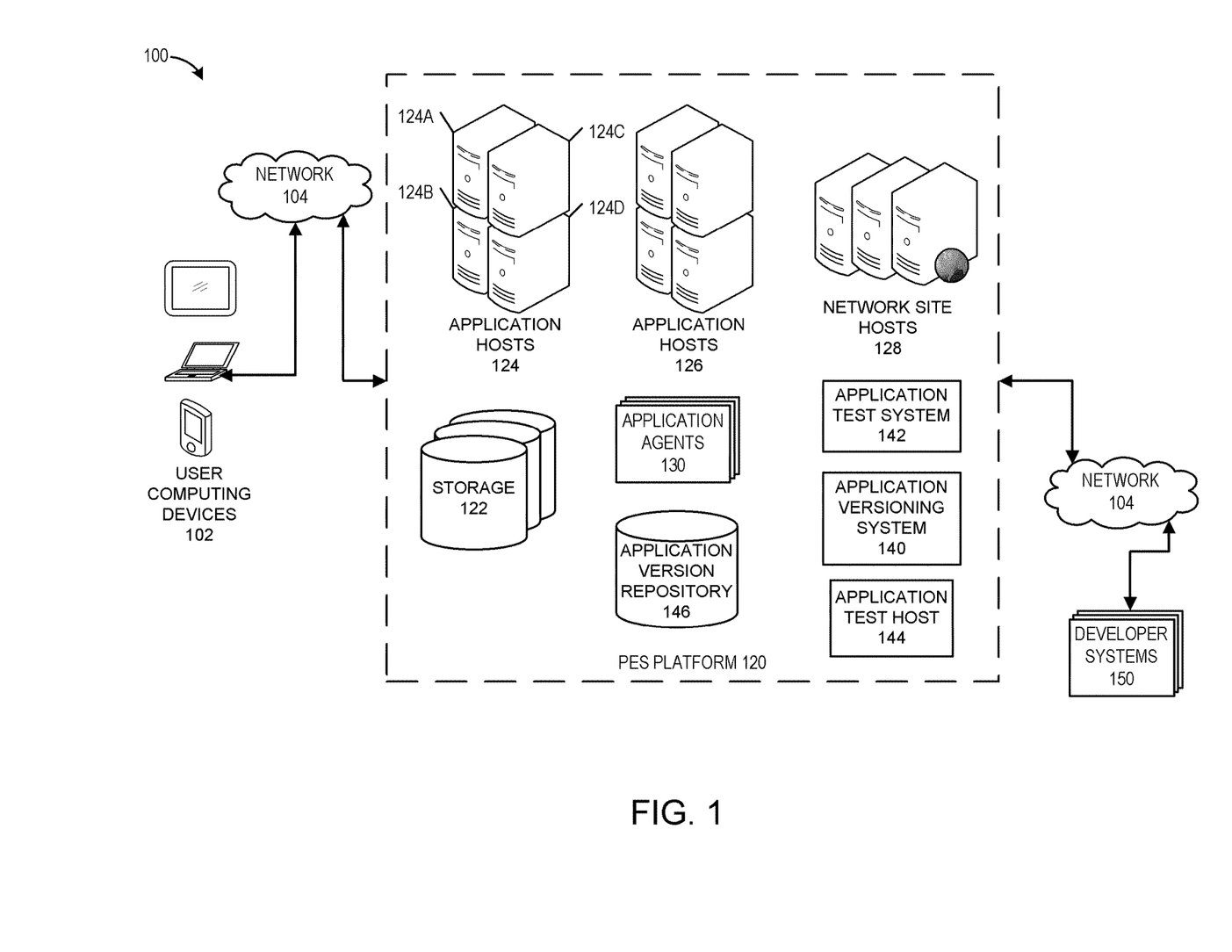
FIG. 1 illustrates an example of a program execution service (PES) environment that can include a PES platform for providing computing resources to multiple user computing systems via a communications network.

FIG. 1 illustrates an example of a program execution service (PES) environment 100 that can include a PES platform 120 for providing computing resources to multiple user computing systems 102 via a communications network 104. The PES platform 120 can provide on-demand access to computing resources, such as storage, virtual machine instances, and processing resources. Further, the PES platform 120 can provide access to one or more applications or services.

Users may access instances of one or more applications or services from the PES platform 120 via user computing devices 102. The user computing devices 102 can include a wide variety of computing devices, including personal computing devices, terminal computing devices, laptop computing devices, tablet computing devices, electronic reader devices, mobile devices (e.g., mobile phones, media players, handheld gaming devices, etc.), wearable devices with network access and program execution capabilities (e.g., "smart watches" or "smart eyewear"), wireless devices, set-top boxes, gaming consoles, entertainment systems, televisions with network access and program execution capabilities (e.g., "smart TVs"), kiosks, speaker systems, and various other electronic devices and appliances.

The PES platform 120 may include a number of computing systems that facilitate providing users with access to computing resources and/or applications. For example, the PES platform 120 includes one or more storage repositories 122, application hosts 124, 126, and network-site hosts 128. The storage repositories 122 may provide users with access to network-based storage. This network-based storage may in some cases be used to store application-data specific to a user for an application accessed at the PES platform 120.

The application hosts 124, 126 may include any type of computing systems that can host one or more applications that can be accessed by users via the user computing devices 102. For example, the applications host 124 may host instances of one application and the applications hosts 126 may host instances of another application. Further, the network site hosts 128 may include any type of computing systems that can host one or more network sites that can be accessed by the user computing devices 102 via the network 104. The application hosted by the application hosts 124, 126 and/or the network sites hosts 128 can include any type of application including single tier applications and multi-tier applications, which may be distributed across multiple computing systems. For example, the application can be an email system or service, a productivity suite, a network site, a retail site, a streaming content service, a video game that can be hosted and/or distributed by a network-based distribution service, etc. In the case of the multi-tier applications, different tiers or components of the application may be hosted or executed by different types of computing systems. In some cases, the application can include a network-based application or component, such as a web application or Internet-based application.

In some embodiments, an application provided by the PES platform 120 may be a multitier application that is distributed among multiple types of systems. For example, a front-end portion of an application may be accessible via a network site hosted by the network site hosts 128, a middleware portion of the application may be hosted by application hosts 124, and a storage layer may be hosted by the storage repositories 122.

The PES platform 120, via for example the application hosts 124, may host different types of applications. Further, the PES platform 120 may host different versions of an application at the same time or over a time period. The applications hosted by the PES platform 120 may be developed by an entity associated with the PES platform 120 or may be developed by a third-party that provides the application to the PES platform 120 for hosting. In some cases, developers may interact with the PES platform 120 using the developer systems 150. Like the user computing devices 102, the developer systems 150 can include a wide variety of devices. In some implementations, the developer systems 150 can include some or all of the types of devices described with respect to the user computing devices 102. Further, the developer systems 150 may communicate with the PES platform 120 via the network 104. In some cases, at least some of the developer systems 150 may be part of the PES platform 120.

The network 104 may include any type of network. Further, the network 104 may be a publicly accessible network of linked networks, possibly operated by various distinct parties. In some cases, the network 104 may include the Internet. In other embodiments, the network 102 may include a private network, personal area network, local area network, wide area network, cable network, satellite network, cellular telephone network, etc., or combination thereof, each with access to and/or from an external network, such as the Internet.

Although not illustrated, the PES platform 120 may include a number of data centers. The data centers may be geographically distributed. Further, the data centers may be distributed on a network. Various systems of the PES platform 120 may be distributed among the different data centers. For example, the application hosts 124 may include application hosts 124A, 124B, 124C, 124D, each of which may be located at a different data center and may share a similar configuration including hosting an instance of the same application.

The PES platform 120 further includes an application versioning system 140 an application test system 142, an application test host 144, an application version repository 146, and one or more application agents 130. Each of the systems may be implemented in software or hardware. Further, at least some of the systems may be implemented by specialized hardware configured to perform one or more of the processes described herein.

The application versioning system 140 may include any system that can identify one or more packages, files, resources, and/or configurations for a particular instance or version of an application. For example, the application versioning system 140 may analyze a deployment of an application instance to determine the constituent parts of the application instance including the compiled source code of the application instance any resources utilized by the application instance during execution.

Further, the application versioning system 140 can include any system that is capable of generating an instance container for a version of an application. The instance container may be bound to a specific data set, such as an application definition, that identifies the constituent parts of a version of an application and resources utilized during deployment and/or execution of an instance of the version of the application. In some cases, the instance container may be configured as an application layer that is separate from other instance containers or application layers. Further, in some cases, the instance container can include a layer or a tier of a multi-layer or multi-tier service. Advantageously, in some embodiments, the separation of the instance container from other instance containers enables the deployment and instantiation of an instance of an application without the risk of accessing files or resources associated with a different application or a different version of the application.

The application test system 142 may include any system that can perform one or more tests on an instance of an application. For example, the application test system 142 may perform one or more tests to determine whether the instance of the application was deployed on a host system, such as the application test host 144, without error. As a second example, the application test system 142 may perform one or more tests to determine whether the instance of the application executes without error and/or performs one or more intended operations or processes.

The application test host 144 may include any system for hosting an instance of an application under test. In some cases, the application test host 144 may be configured as a production system, such as the application host 124. Alternatively, or in addition, the application test host 144 may be configured with one or more systems for monitoring the deployment and execution of an instance of an application under test.

Application version repository 146 may include any repository that is configured to store an application definition for a version of an application. Further, application version repository 146 may include information relating to the status of one or more instance containers and/or one or more instances of an application deployed with respect to an instance container.

The application agents 130 may include any system that can monitor the status of one or more application instances and/or one or more instance containers. Further, the application agents 130 may maintain a number of deployed application instances for an instance container. In addition, the application agents 130 may instantiate or remove application instances based on the current version of an instance container and/or the number of currently deployed or instantiated application instances of a particular instance container. In some cases, the application agents 130 maintain a number of deployed or running application instances based on a number of active users within a particular geographic or network location.

Example Application Definition Stack

Figure 2:
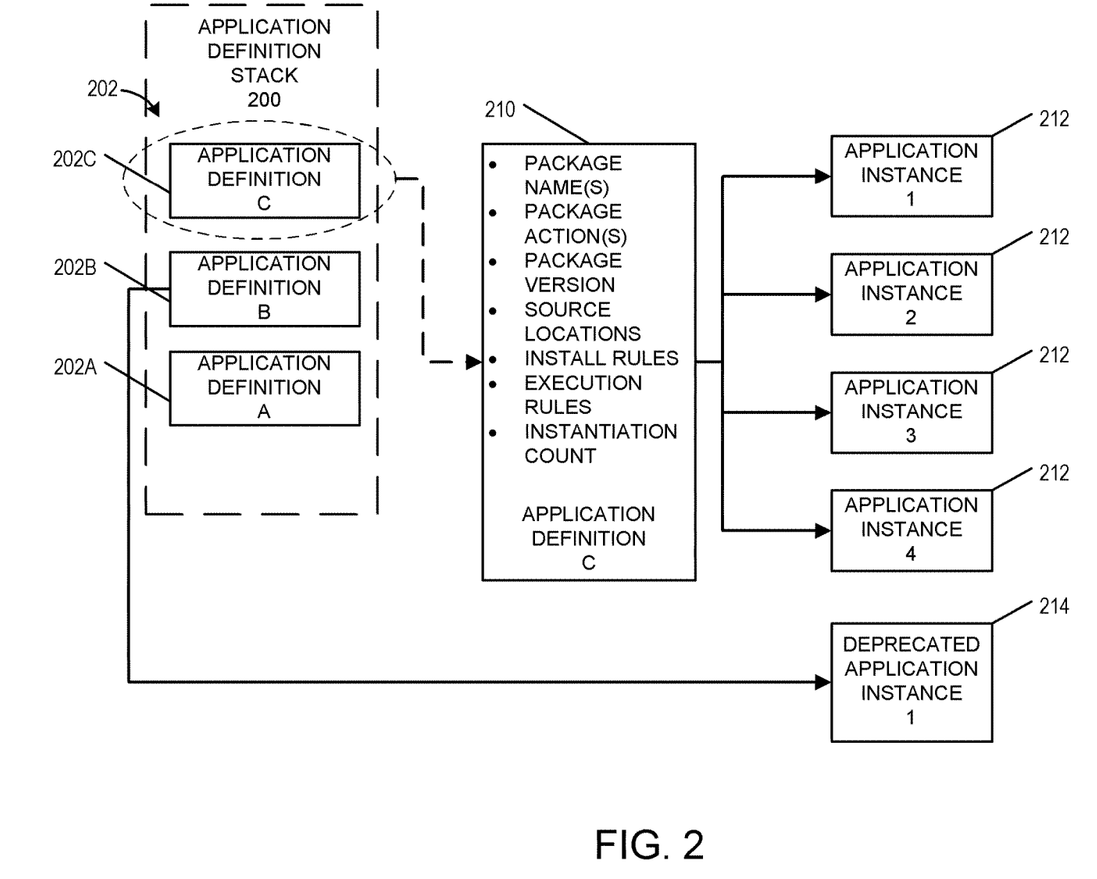
FIG. 2 illustrates an example of an application definition stack that includes a number of application instance containers.

FIG. 2 illustrates an example of an application definition stack 200 that includes a number of application instance containers 202. The application instance containers 202 provide separated access to computing resources. In other words, application instances corresponding to one instance container 202C are generally separate from application instances corresponding to another instance container 202B. Thus, advantageously, in certain embodiments, an application instance running in one instance container 202C will typically access resources corresponding to the instance container 202C and will not access resources associated with another instance container 202B.

Each of the application instance containers 202 may include an application definition A, B, C. Thus, the instance container 202A includes an application definition A, the instance container 202B includes an application definition B, and the instance container 202C includes an application definition C. The application definitions may include information that defines an application that can be deployed on one or more application hosts 124. The application definitions may include the specification(s) used to install the packages. One example of an application definition is illustrated by the detail 210, which is an embodiment of the application definition C of the instance container 202C. As can be seen by the detail 210, the application definition C can include package names, package actions (e.g., install, register, remove, copy, etc.), package version (e.g., exact version-release, latest release within a version, latest available version), source locations for the files, install rules (e.g., where to install files, whether to overwrite particular files, etc.), execution rules (e.g., data to be provided upon execution, execute in a window or full screen, etc.), package notifications (e.g., restart/reload services when a change has happened on this package), instantiation count (e.g., how many instances of the application are permitted), etc. Additional information that may be included in the application definitions can include resources to allocate to an instance of the application (e.g., storage resources, processor resources, libraries, etc.), time-to-live for the instance of the application before it is replaced by a new application instance, number of users supported by the instance of the application, and any other information that may be used to regulate the deployment and use of an instance of an application deployed based on the application definition. The application definitions may be stored in the application version repository 146.

As further illustrated in FIG. 2, a number of instances of an application may be deployed based on an application definition. For example, four application instances 212 may be deployed based on the application definition corresponding to the instance container 202C. At least some of the application instances 212 may be deployed on a different application host 124 than some other of the application instances 212. Each time a new application instance is desired, a new application instance can be generated using the current application definition.

In some cases, previous application instances based on older application definitions may exist. The older application definitions may correspond to older versions of the application. For instance, the deprecated application instance 214 may be generated based on an application definition corresponding to the instance container 202B. The deprecated application instance 214 may be replaced by an application instance 212 based on the current application definition. In certain embodiments, the deprecated application instance 214 may refer to application instances that have been deployed or installed using an application definition that is no longer the most recent application definition or approved application definition. In some cases, the deprecated application instance 214 may refer to application instances that are no longer supported by an entity, but may or may not be based on the previously most recent application definition. For example, in some cases, multiple versions of an application may be supported before being removed from user access.

In certain embodiments, by maintaining separate instance containers 202 for each version of an application, one version of an application will not include files or resources (e.g., libraries) designated for another version of the application. Thus, errors relating to the unintentional mixing of file versions can be eliminated. Further, by maintaining separate instance containers for different versions of applications, the process of rolling back an application to a prior version due, for example, to a previously undetected error in the newer application version, is simplified. Instead of modifying an install script and manually updating deployed application instances, the identity of the current instance container 202 can be changed to select the desired instance container 202 for deploying new application instances.

In some embodiments, each instance container can be considered a separate layer of the application definition stack 200. These stacks may generally be independent from each other. Thus, an application instance created from an application definition corresponding to a layer of the application definition stack 200 will include packages and files identified in the application definition without the risk of inadvertently including files or packages corresponding to a different application definition.

In certain embodiments, by maintaining instance containers for different application definitions, promoting versions of an application from one development stage to another can be simplified because individual files and resources do not need to be identified. Instead, the instance container may be identified for promotion. In such a case, the files, software packages, and other features identified by an application definition bound to the promoted instance container may automatically be associated with the promoted stage of the software development cycle without specifically identifying or updating individual items specified in the application definition. Thus, a specific instance container used for a Beta version of an application can be promoted to a Gamma version and each file, package, script, resource of the Beta version can automatically be promoted to the Gamma version without separately identifying and promoting the constituent components and resources of the application. Thus, errors during the promotion process due to misidentification of files, packages, scripts, or other constituent components of an application may be reduced or eliminated.

Example Instance Container Generation Process

Figure 3:
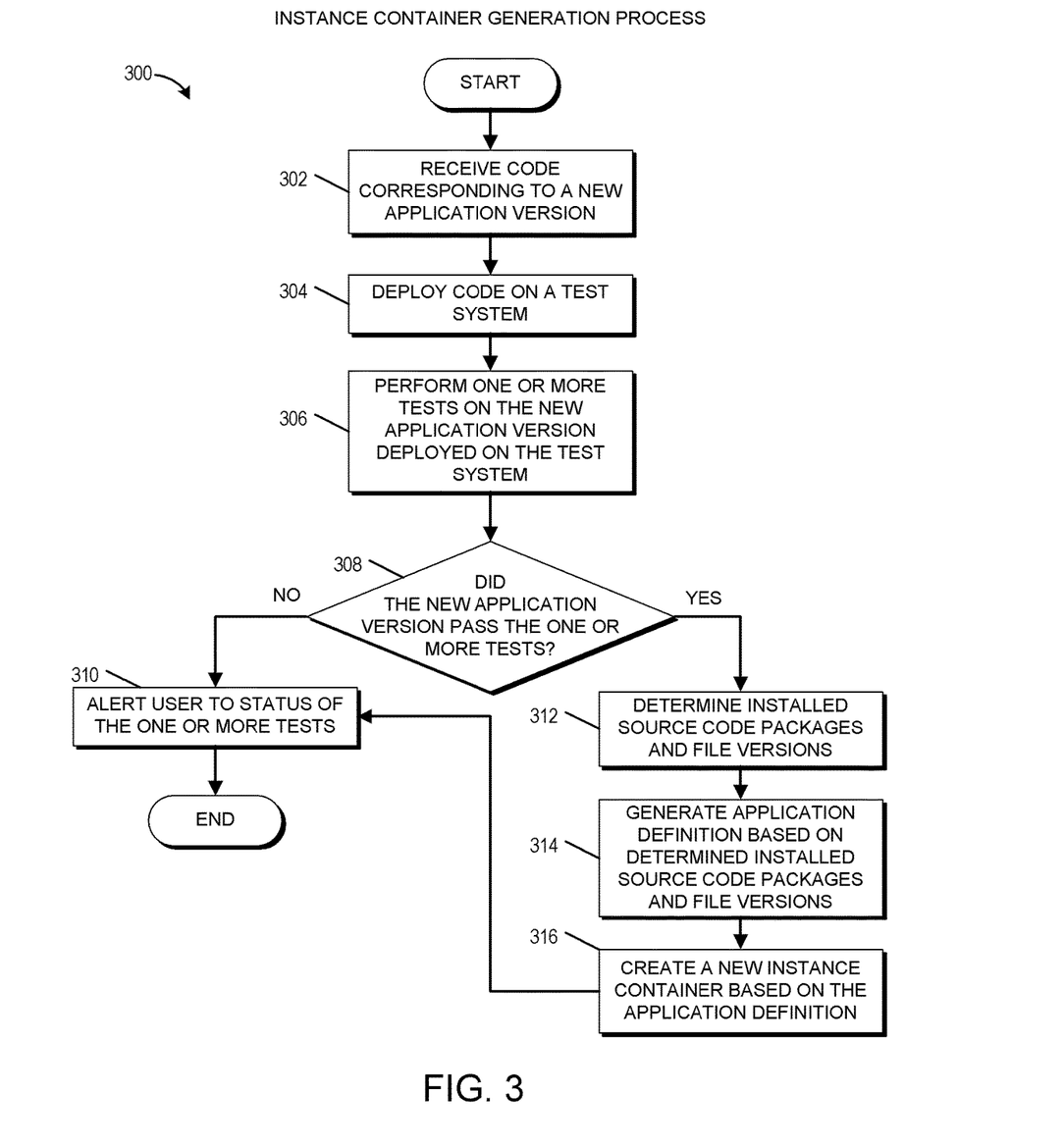
FIG. 3 is a flowchart of an embodiment of an instance container generation process.

FIG. 3 is a flowchart of an embodiment of an instance container generation process. The process 300 may be implemented by any system that can generate an instance container for a version of an application. For example, the process 300 in whole or in part, can be implemented by an application versioning system 140, an application test system 142, an application test host 144, and application agents 130, to name a few. Although any number of systems, in whole or in part, can implement the process 300, to simplify the discussion, portions of the process 300 will be described with reference to particular systems.

The process 300 begins at block 302 where, for example, the application test system 142 receives code corresponding to a new application version. The received code can include source code that has not been compiled and/or executable code that has been compiled.

At block 304, the application test system 142 deploys the code received at the block 302 on a test system, such as the application test host 144. In some embodiments, the test system may be one of the application hosts 124, 126. Further, in some cases, such as when the application is a distributed application, the test system may be a set of systems. Deploying the code may include installing, compiling, linking the code with one or more resources, or registering the code with one or more resources. Further, deploying the code may include providing access to shared libraries, such as dynamic-link libraries (DLL). Moreover, deploying the code may include identifying the location of dynamically loaded libraries for access by the application corresponding to the code received at the block 302. In some embodiments, the block 304 may include executing the new application version corresponding to the received code.

At block 306, the application test system 142 performs one or more tests on the new application version deployed on the test system. The application test system 142 determines at the decision block 308 whether the new application version passed, or satisfied, the one or more tests. If the new application version did not satisfy one of the tests, the application test system 142 alerts the user to the status of the one or more tests at block 310. After alerting the user at the block 310, the process 300 ends. In some embodiments, the block 310 may be optional or omitted. Further, in certain embodiments, the blocks 306 and 308 may both be optional or omitted. For instance, a user may designate a new application version to be associated with a new instance container without requiring the performance of one or more tests. Further, in some cases, a new instance container may be generated for the new application version regardless of the results of the one or more tests.

At block 312, the application versioning system 140 determines installed source code packages and file versions for the various packages and files deployed as part of the block 304. The block 312 may further include identifying additional resources deployed with the new application version and/or used by the application on the application test host 144. Further, the block 312 may include identifying a version of a deployment or installation script, a version of an operating system on the application test system 142, and/or any application or resource that may be used to install and/or execute an instance of the new application version. The block 312 may generally be performed automatically without input from a user. However, in some embodiments, a user may identify one or more storage locations where portions of the code corresponding to the new application version and resources used by the new application version may be located.

At block 314, the application versioning system 140 generates an application definition based on the determined installed source code packages and file versions identified at the block 312. The generated application definition may be stored at the application version repository 146. Further, the generated application definition may include any information necessary for identifying files to be installed or employed within the instance of the new application version.

In addition, the generated application definition may include any information necessary for executing an instance of the new application version.

At block 316, the application versioning system 140 crates a new instance container based on the application definition generated at the block 314. In some cases, the block 316 includes accessing the application definition from the application version repository 146. Further, in some cases, the block 316 includes registering the new instance container with an application agent 130. Registering the new instance container with the application agent 130 may, in some cases, include generating a new instance of an application agent 130 that is associated with the application definition and/or with instances of the new application version generated based on the application definition. In other cases, a new instance container may be registered with an existing application agent is associated with the application regardless of the specific version of the application.

In some cases, the process 300 completes after the block 316. In other cases, the process 300 may include performing the block 310 to alert the user of the status of the one or more tests performed at the decision block 308.

Example Application Instance Deployment Process

Figure 4:
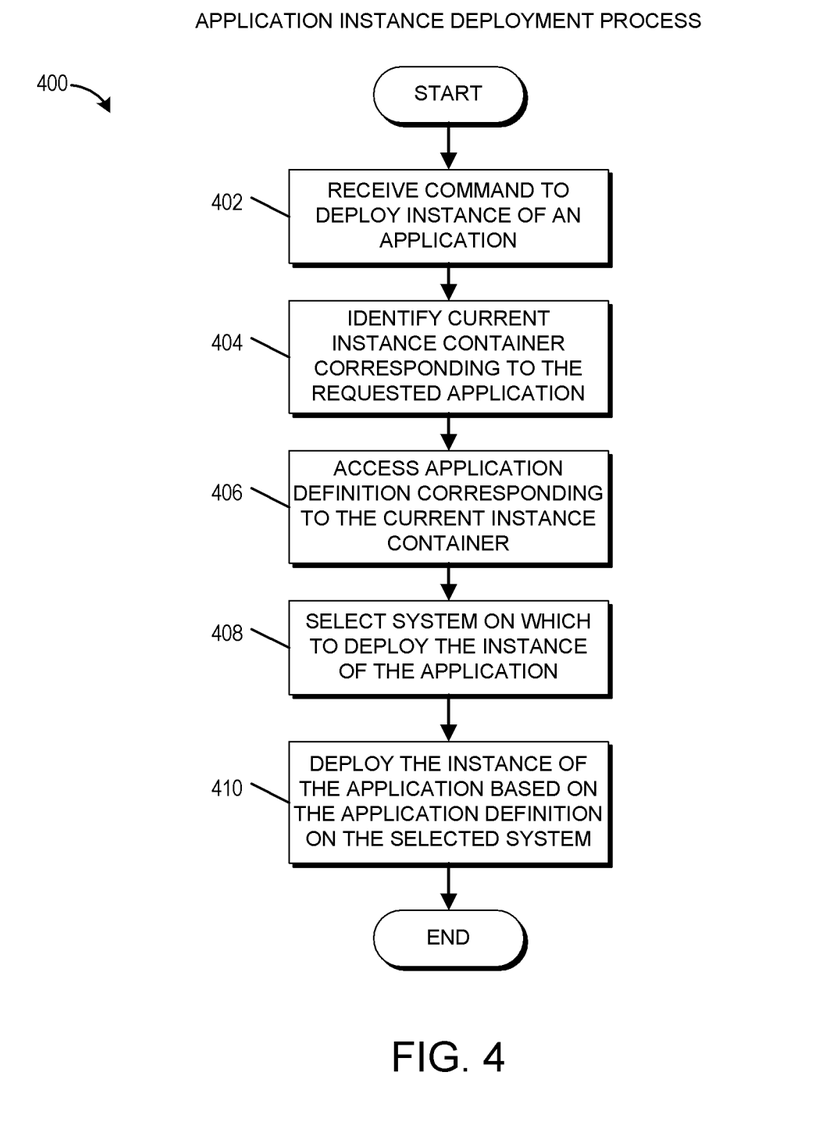
FIG. 4 is a flowchart of an embodiment of an application instance deployment process.

FIG. 4 is a flowchart of an embodiment of an application instance deployment process. The process 400 may be implemented by any system that can deploy an instance of an application on an application host, or other system capable of providing access to the application or resource. For example, the process 400 in whole or in part, can be implemented by an application versioning system 140, an application test system 142, an application test host 144, and application agents 130, to name a few. Although any number of systems, in whole or in part, can implement the process 400, to simplify the discussion, portions of the process 400 will be described with reference to particular systems.

The process 400 begins at block 402 where, for example, an application agent 130 receives a command to deploy an instance of an application. The command may be received from a user, or in response to an action by the user. Alternatively, the command may be received or generated by a system associated with the PES platform 120 as part of maintenance process. For instance, the command may be generated in response to determining that an existing instance of the application has been deployed or has been in use for a threshold period of time. As another example, the command may be generated in response to determining that a threshold number of users are accessing the available number of instances of the application. This threshold number of users may depend on the available number of instances of the application. In some cases, the application agent 130 may determine that a new instance of the application is to be deployed without receiving a command. For instance, the application agent 130 may determine that the threshold number of users accessing the currently available number of instances of application has been satisfied and thus may trigger the deployment of a new instance of the application.

At block 404, the application agent 130 identifies a current instance container corresponding to the requested application. The current instance container may be the instance container designated for deployment of new instances of the application. Generally, the current instance container includes an application definition for the newest version of the application. However, in some cases, the current instance container includes an application definition for a version of the application that is not the newest or latest version. This may occur, for instance, when rolling back an application to a prior version of the application due, for example, to the discovery of a flaw in the newest version of the application.

At block 406, the application agent 130 accesses an application definition corresponding to the current instance container. This application definition may be accessed from the application version repository 146. At block 408, the application agent 130 selects the system on which to deploy the instance of the application. The system may be selected based at least in part on the application definition, the type of application, the location of a user attempting to access the instance of the application, by an administrator, the availability of application hosts designated for the application, and any other process for selecting the host system. In some embodiments, an application host system is configured to host a single instance of a single application. In other embodiments, the application host system is configured to host multiple instances of a single application. In yet other embodiments, the application host system may host multiple instances of multiple applications. Thus, in some cases, the selection of the system on which to deploy the instance of the application may differ based on the configuration of the application host systems in the PES platform 120.

At block 410, the application agent 130 deploys the instance of the application based on the application definition of the selected system. Deploying the instance of the application may include installing the application, executing application, linking the application to one or more resources, such as a library, and any other process for preparing an application instance for access and/or executing an application instance.

In some implementations, deploying the instance of the application may include adding the instance to the instance container. This may involve adding the instance to a grouping, table, or list of instances bound to the instance container. The instance may then be initiated and once started or booted, it can contact a deployment service (e.g., an application agent 130) to determine which instance container the instance is a member of. Once the instance has identified its associated instance container, the instance can deploy and execute itself on a computing system (e.g., an application host 124) based on the application definition associated with the identified instance container. Alternatively, the application agent 130 associated with the instance container may finish deploying the application instance and cause the application instance to execute.

In one example implementation, an instance may determine what components of an application to deploy and how to deploy the components. This deployment process may involve the instance extracting a service version from the instance container. The service version may include a set of specific package versions and configuration versions to be deployed. The instance may further download an application definition or a version-set for the application, which may include any versioned file or service for installing or executing an instance of the application. The version-set data may include information about which versions of a package or file are required for the instance.

Further, the version-set data may include deployment scripts to facilitate deploying or installing the application instance. For instance the version-set data or application definition may include the version of the deployment script to deploy, the version of the configuration files, and the version of packages to install. One example version-set data may identify version 349 of a deployment script, version 19 of a configuration file, version 2.3.5 of a first package, and version 5.4.1 of a second package. This example version-set data may be generated automatically by analyzing a test deployment (e.g., by reading metadata for the packages). Further, the version-set data may be administratively bound to the instance container by, for example, generating a new instance of a data structure for maintaining a list of active instances. Each instance of the application added to the data structure may be generated based on the bound version-set data.

The instance can download the identified versions of the configuration files and deployment scripts. Further, the instance may execute the deployment scripts to complete download and installation of components of the application. The deployment scripts may install the files and packages based on the version-set data and may configure the host system based on the configuration files or data.

In some embodiments, a number of previous instance containers are maintained. The previous instance containers may be empty but may be used when rolling back a version of an application. For example, if a bug is identified after deployment of a new version of the application, the previous instance containers may be used to revert to a previous version of the application. This may be accomplished by binding new instances of the application to a previous instance container and using the version-set data or application definition from the previous instance container to deploy and execute new instances.

In some cases, the application may be a multi-tiered application. In some such cases, the block 408 may include selecting multiple host systems (e.g., a network site host 128 for a front-end system and an application host 124 for a backend system). Further, the block 410 may include deploying portions of the instance on each of the selected host systems. Moreover, in some such cases, deploying the instance of the application may include linking the portions of the instances of the application together by, for example, providing an address (e.g., MAC address) or identity of systems hosting different portions or tiers of the application to other portions or tiers of the application.

Example Application Instance Upgrade Process

Figure 5:
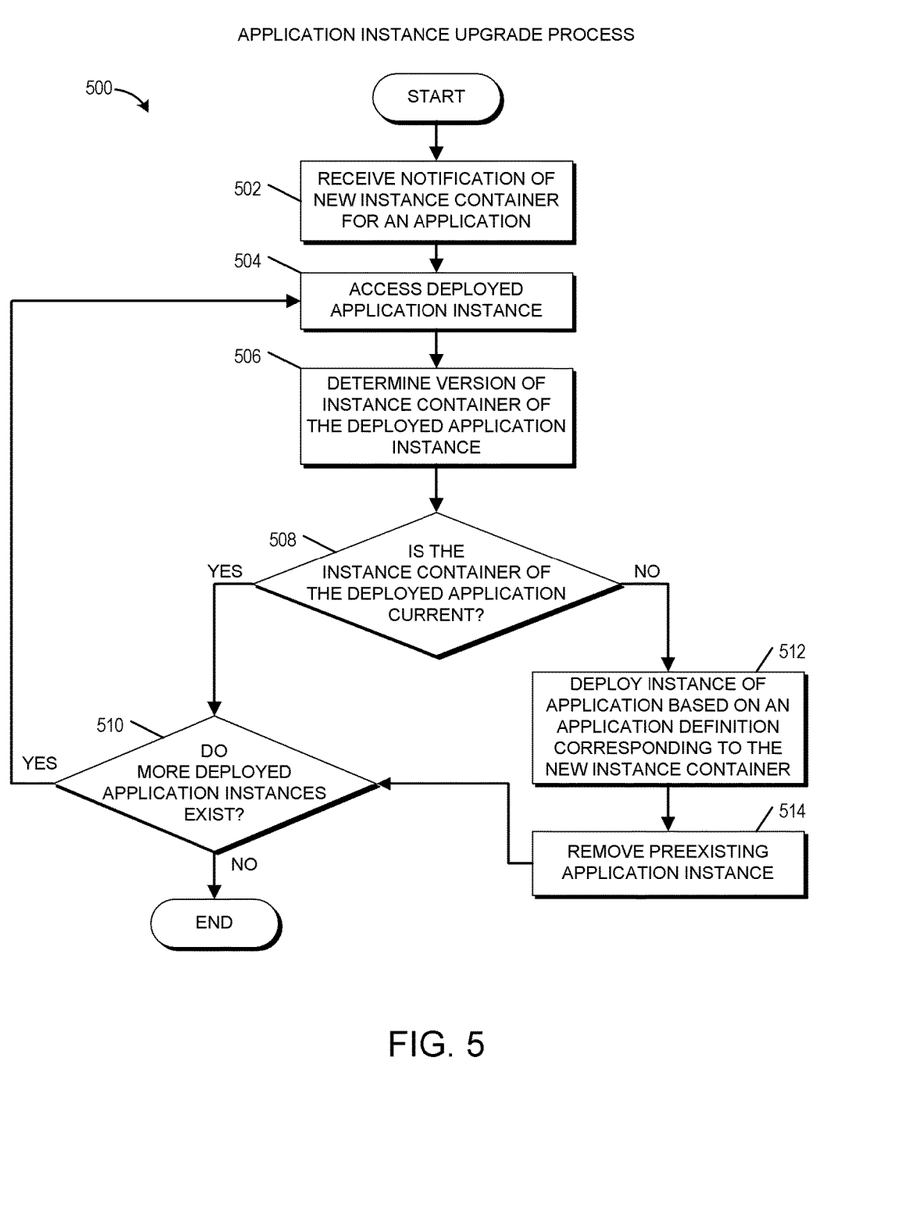
FIG. 5 is a flowchart of an embodiment of an application instance upgrade process.

FIG. 5 is a flowchart of an embodiment of an application instance upgrade process. The process 500 may be implemented by any system that can update or upgrade a set of application instances to a different version of the application. For example, the process 500 in whole or in part, can be implemented by an application versioning system 140, an application test system 142, an application test host 144, and application agents 130, to name a few. Although any number of systems, in whole or in part, can implement the process 500, to simplify the discussion, portions of the process 500 will be described with reference to particular systems.

Usually, the process 500 updates the application instances to a newer version of the application. However, in some cases, the process 500 may be used to replace the application instances with older versions of the application. This can also be referred to as "restoring" the application instances to older versions of the application. For example, if a vulnerability is discovered that can be exploited in a new version of the application, but not in an older version of the application, the running instances of the application may be replaced with the older version of the application while the vulnerability is patched.

The process 500 begins at block 502 where, for example, an application agent 130 receives a notification of the availability of a new instance container for an application. In some implementations, an application agent 130 may exist for each application. In such cases, the application agent 130 receiving the notification may correspond to the application associated with the notification. In some cases, the notification is of a change in the designation of the active instance container, which may or may not be a new instance container. For instance, in cases where application instances are being rolled back to a previous version of the application, the notification may identify a previously existing instance container that was previously deprecated but is now designated as the current or active instance container. In some cases, the notification of the block 502 may be received from the application versioning system 140. Alternatively, or in addition, the notification may be received in response to an action by a user (e.g., an administrator).

At block 504, the application agent 130 accesses a deployed application instance. Accessing the deployed application instance may include accessing an application host (e.g., the application host 124A) that hosts an instance of the application. Alternatively, or in addition, accessing the deployed application instance may include accessing one or more entries in the application version repository 146 corresponding to the deployed application instances. In some cases, accessing deployed application instances includes accessing one or more of application instances deployed on host systems, application instances that are currently executing, application instances that are available for access by users, and application instances that are currently in use or being accessed by one or more users.

At block 506, the application agent 130 determines a version of the instance container for the deployed application instance accessed at the block 504. Determining the version of the instance container may include accessing data associated with the version container from the application version repository 146. Alternatively, or in addition, determining the version of the instance container may include accessing metadata and/or one or more files corresponding to the deployed application instance.

The application agent 130 determines at the decision block 508 whether the instance container of the deployed application is current. Determining whether the instance container is current may include determining whether the instance container is the new instance container. In some cases, multiple versions of the instance container may be current or still designated for deployment. In other cases, although a single version of the instance container is designated for deployment, application instances associated with additional versions of the instance container may be approved for further use. Thus, in some cases, the decision block 508 may include determining whether the instance container of a deployed application is obsolete, deprecated, or tagged or designated for removal.

If it is determined at the decision block 508 that the instance container of the deployed application is current, or is not designated as obsolete or deprecated, the process 500 proceeds to the decision block 510 where the application agent 130 determines whether additional deployed application instances exist. If no additional deployed application instances exist, the process 500 ends. If additional deployed application instances do exist the process 500 returns to the block 504 where another deployed application instances accessed.

If it is determined at the decision block 508 that the instance container of the deployed application is not current, is designated for removal, or is obsolete or deprecated, the process 500 proceeds to the block 512. At the block 512, the application agent deploys an instance of the application based on an application definition corresponding to the new instance container. In some embodiments, the block 512 may include performing the process 400.

At block 514, the application agent 130 removes the pre-existing application instance accessed at the block 504. In some cases, the block 514 may include deleting the application instance or making the host system of the application instance available for deployment of a new application instance for the application or for another application. In some cases, the block 514 may include transitioning or moving users of the application instance designated for removal to the new application instance or another existing application instance. Alternatively, or in addition, the block 514 may include waiting until users currently accessing the application instance cease accessing the application instance before the application instance is removed. Further, the block 514 may prevent additional users from accessing the application instance.

The process 500 may proceed to the decision block 510 where it is determined whether more deployed application instances exist. If so, the process 500 may return to the block 504. If additional deployed application instances do not exist, the process 500 ends.

Terminology

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

It is to be understood that not necessarily all such advantages can be achieved in accordance with any particular embodiment of the embodiments disclosed herein. Thus, the embodiments disclosed herein can be embodied or carried out in a manner that achieves or optimizes one advantage or group of advantages as taught herein without necessarily achieving other advantages as may be taught or suggested herein. No feature or group of features is necessary or essential to every embodiment.

The various illustrative logical blocks, modules, and algorithm steps described in connection with the embodiments disclosed herein can be implemented as electronic hardware programmed with specific instructions to implement the particular disclosed blocks and modules, computer software, or combinations of both. Further, the various illustrative logical blocks and modules described in connection with the embodiments disclosed herein can be implemented or performed by a machine, such as a general purpose processor programmed with specific instructions to implement the particular disclosed blocks and modules, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can include electrical circuitry or digital logic circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, or algorithm described in connection with the embodiments disclosed herein can be embodied directly in hardware, in a software module stored in one or more memory devices and executed by one or more processors, or in a combination of the two. A software module can reside in RAM memory, flash memory, ROM memory, EPROM memory, EEPROM memory, registers, hard disk, a removable disk, a CD-ROM, or any other form of non-transitory computer-readable storage medium, media, or physical computer storage. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Further, the term "each," as used herein, in addition to having its ordinary meaning, can mean any subset of a set of elements to which the term "each" is applied.

Disjunctive language such as the phrase "at least one of X, Y and Z," unless specifically stated otherwise, is to be understood with the context as used in general to convey that an item, term, etc. may be either X, Y, or Z, or a combination thereof. Thus, such conjunctive language is not generally intended to imply that certain embodiments require at least one of X, at least one of Y and at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments of the inventions described herein can be embodied within a form that does not provide all of the features and benefits set forth herein, as some features can be used or practiced separately from others.

What is claimed is:

1. A method of version control for an application deployed in a data center of a Program Execution Service (PES), the method comprising:
receiving, by an application versioning system comprising computer hardware, a first version of an application, wherein receiving the first version of the application comprises receiving source code files for the first version of the application;
deploying, by the application versioning system, the first version of the application on an application test host, the application test host comprising a computing system configured to execute the first version of the application, wherein deploying the first version of the application comprises compiling the source code files and installing the compiled source code files on the application test host;
performing, by an application test system comprising computer hardware, one or more tests on the deployed first version of the application; and
responsive to the deployed first version of the application satisfying the one or more tests:
identifying, by the application versioning system, deployed application components for the deployed first version of the application;
generating, by the application versioning system, a first application definition based at least in part on the identified deployed application components; and
creating a first instance container based at least in part on the first application definition, wherein the first instance container is one of a set of instance containers, each instance container of the set of instance containers corresponding to a different version of the application.

2. The method of claim 1, wherein, responsive to the deployed first version of the application satisfying the one or more tests, the method further comprises identifying application resources accessed by the deployed first version of the application, wherein generating the first application definition further comprises generating the first application definition based at least in part on the identified application resources.

3. The method of claim 1, wherein, responsive to the deployed first version of the application satisfying the one or more tests, the method further comprises:
accessing a deployed instance of the application, the deployed instance of the application deployed on a host computing system configured to host the application;
identifying an instance container corresponding to the deployed instance of the application; and
responsive to determining that the instance container is a second instance container, deploying a new instance of the application based at least in part on the first instance container, wherein the second instance container differs from the first instance container.

4. The method of claim 3, further comprising deactivating the deployed instance of the application associated with the second instance container.

5. The method of claim 1, further comprising:
receiving a command to deploy an instance of the application;
accessing a set of instance containers for the application, wherein the set of instance containers includes the first instance container;
identifying a current instance container based on a status associated with each instance container of the set of instance containers; and
deploying the instance of the application based at least in part on the current instance container.

6. A system for performing version control for an application deployed in a data center of a Program Execution Service (PES), the system comprising:
an application versioning system comprising computer hardware, the application versioning system configured to:
receive a first version of an application; and
deploy the first version of the application on a first host system, the first host system configured for application testing; and
an application test system comprising computer hardware, the application test system configured to perform one or more tests on the deployed first version of the application,
wherein the application versioning system, in response to the deployed first version of the application satisfying the one or more tests, is further configured to:
identify deployed application components for the deployed first version of the application; and
create a first instance container based at least partially on the identified deployed application components.

7. The system of claim 6, wherein creating the first instance container comprises defining an application definition based at least partially on the identified deployed application components.

8. The system of claim 7, wherein the application definition comprises data corresponding to at least one or more of the following: package names, package actions, package versions, file names, file versions, source locations of the files, source locations for the packages, deployment rules, execution rules, package notifications, instantiation count limits, time-to-live for an instance of the application, libraries used by the application, resources used by the application, or deployment locations for portions of the application.

9. The system of claim 6, wherein identifying deployed application components includes identifying resources utilized by the first version of the application during execution of an instance of the first version of the application.

10. The system of claim 6, further comprising an application agent comprising computer hardware, the application agent configured to deploy an instance of the application based on an application definition corresponding to the first instance container in response to receiving a command to deploy a new instance of the application.

11. The system of claim 10, wherein the application agent is one of a set of agents, each agent of the set of agents corresponding to a different instance container.

12. The system of claim 10, wherein the application agent is further configured to determine whether a currently deployed instance of the application is associated with a deprecated instance container and in response to determining that the currently deployed instance of the application is associated with the deprecated instance container, the application agent is further configured to:
  remove the currently deployed instance of the application from a set of application instances accessible by customers; and
  deploy a new instance of the application based on the application definition corresponding to the first instance container.

13. The system of claim 10, wherein the application agent is further configured to transition users from a currently deployed instance of the application associated with a deprecated instance container to the instance of the application based on the application definition corresponding to the first instance container.

14. The system of claim 13, wherein the deprecated instance container corresponds to a newer application definition created more recently than an application definition corresponding to the first instance container, whereby transitioning users from the currently deployed instance of the application associated with the deprecated instance container to the instance of the application based on the application definition corresponding to the first instance container enables the application agent to rollback a newer version of the application to an older version of the application.

15. The system of claim 6, wherein creating the first instance container further comprises deprecating a second instance container and designating the first instance container as a current instance container, the current instance container used to generate new instances of the application.

16. The system of claim 15, wherein said deprecating the second instance container occurs after a threshold number of instances of the application generated based on the first instance container execute without error for a threshold time period.

17. Non-transitory physical computer storage comprising instructions stored thereon that, when executed by one or more processors, implement a system for performing version control for an application deployed in a data center, the system comprising:
  an application versioning system configured to:
    access a host system that hosts an approved instance of an application;
    determine an application definition based on the approved instance of the application, the application definition identifying one or more files associated with the application;
    generate an instance container based at least in part on the application definition; and
    designate the instance container as a current instance container; and
  an application agent configured to deploy one or more instances of the application based at least in part on the current instance container.

18. The non-transitory physical computer storage of claim 17, wherein the application agent is further configured to replace one or more obsolete instances of the application with the one or more instances of the application, the one or more obsolete instance of the application based at least in part on an obsolete instance container.

19. The non-transitory physical computer storage of claim 18, wherein the application agent is further configured to restore the one or more obsolete instances of the application to obtain one or more restored instances of the application and to replace the one or more instances of the application with the one or more restored instances of the application.

20. The non-transitory physical computer storage of claim 17, wherein the approved instance of the application comprises a test application instance that satisfies one or more tests performed on the host system with respect to the test application.

\* \* \* \* \*